United States Patent
Lauritano et al.

(10) Patent No.: US 10,344,654 B2
(45) Date of Patent: Jul. 9, 2019

(54) SELECTIVE CATALYTIC REDUCTION STEADY STATE AMMONIA SLIP DETECTION WITH POSITIVE PERTURBATION

(71) Applicant: GM GLOBAL TECHNOLOGY OPERATIONS LLC, Detroit, MI (US)

(72) Inventors: Luca Lauritano, Turin (IT); Luis Daniel Guerrero Cruz, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 39 days.

(21) Appl. No.: 15/699,210

(22) Filed: Sep. 8, 2017

(65) Prior Publication Data
US 2019/0078480 A1    Mar. 14, 2019

(51) Int. Cl.
*C01C 1/18* (2006.01)
*F01N 3/08* (2006.01)
*F01N 3/20* (2006.01)
*C01B 21/04* (2006.01)
*C01B 21/20* (2006.01)

(52) U.S. Cl.
CPC .......... *F01N 3/208* (2013.01); *C01B 21/0422* (2013.01); *C01B 21/20* (2013.01); *C01C 1/18* (2013.01); *F01N 3/0842* (2013.01); *F01N 3/2073* (2013.01)

(58) Field of Classification Search
CPC ...... F01N 3/208; F01N 3/2073; F01N 3/0842; C01C 1/18; C01B 21/0422; C01B 21/20
See application file for complete search history.

(56) References Cited

U.S. PATENT DOCUMENTS

2011/0041477 A1* 2/2011 Mullins ................. F01N 3/0821
60/274

* cited by examiner

*Primary Examiner* — Brandon D Lee
(74) *Attorney, Agent, or Firm* — Cantor Colburn LLP

(57) ABSTRACT

Described herein is a method for detecting steady state ammonia slip for a motor vehicle having an internal combustion engine and an emissions control system. The emissions control system includes a selective catalytic reduction (SCR) device, a NOx sensor, and a controller. The controller executes a method for ammonia slip detection that includes determining if the SCR device is at steady state, comparing a NOx measurement from the NOx sensor with a predicted NOx value. If the NOx measurement exceeds the predicted NOx value by a threshold, perturbing a reductant injection, the perturbation having a selected magnitude and a selected duration. The method also includes measuring a NOx value resulting from the perturbation and computing a gradient thereof relative to the measured NOx, and ascertaining if a gradient of the NOx resulting from the perturbation exceeds a threshold and identifying a reductant slip condition if so.

20 Claims, 5 Drawing Sheets

SELECTIVE CATALYTIC REDUCTION STEADY STATE AMMONIA SLIP DETECTION WITH POSITIVE PERTURBATION

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

Described herein is a method for detecting steady state ammonia slip for a motor vehicle having an internal combustion engine and an emissions control system. The emissions control system includes a selective catalytic reduction (SCR) device, a NOx sensor, and a controller. The controller executes a method for ammonia slip detection that includes determining if the SCR conditions (in term of SCR Temperature and NOx input) are at steady state, comparing a NOx measurement from the NOx sensor with a predicted NOx value. If the NOx measurement exceeds the predicted NOx value by a threshold, perturbing a reductant injection, the perturbation having a selected magnitude and a selected duration. The method also includes measuring a NOx value resulting from the perturbing and computing a gradient thereof relative to the measured NOx, and ascertaining if a gradient of the NOx resulting from the perturbing exceeds a threshold and identifying a reductant slip condition if so, otherwise, identifying a poor operating condition for the internal combustion engine.

In addition to one or more of the features described above, or as an alternative, further embodiments may include a temperature sensor and another NOx sensor.

In addition to one or more of the features described above, or as an alternative, further embodiments may include that the another NOx sensor is upstream of the SCR device and wherein the determining includes computing a gradient of a temperature of the SCR device and a gradient of the NOx measured by the another NOx sensor.

In addition to one or more of the features described above, or as an alternative, further embodiments may include that the determining further includes identifying the SCR devices as at steady state if the gradient of a temperature of the SCR device is less than a third selected threshold value and a gradient of the NOx measured by the another NOx sensor is less than a fourth selected threshold value.

In addition to one or more of the features described above, or as an alternative, further embodiments may include that the predicted NOx value is based on a chemical model of the SCR device.

In addition to one or more of the features described above, or as an alternative, further embodiments may include that the NOx sensor is located downstream from the SCR device.

In addition to one or more of the features described above, or as an alternative, further embodiments may include that at least one of the selected magnitude and selected duration of the perturbation of the reductant injection is based on at least one of a magnitude of a steady state reductant injection, an exhaust flow and a temperature.

In addition to one or more of the features described above, or as an alternative, further embodiments may include the controller adapting a reductant dosing rate of the SCR device according to the ascertaining to achieve a desired NH3 storage.

Also described herein in an embodiment is an exhaust system for treating exhaust gas emitted by an internal combustion engine, configured to perform a selective catalytic reduction (SCR) of exhaust gas. The exhaust system includes a controller configured to perform ammonia slip detection by determining if an SCR device is in a steady state operating condition with a steady state reductant injection and comparing a steady state NOx measurement from the NOx sensor with a predicted steady state NOx value. In response to a magnitude of the steady state NOx measurement exceeding the predicted steady state NOx value by a first threshold value, the method also includes perturbing the reductant injection corresponding the steady state, the perturbation of the reductant injection having a selected magnitude and a selected duration, measuring a NOx value resulting from the perturbation of the reductant injection and computing a gradient in the NOx value resulting from the perturbation the reductant injection relative to the NOx value measured at steady state, determining if the reductant consumed by the SCR device resulting from the perturbation exceeds a second selected threshold, and ascertaining if a gradient of the NOx resultant from the perturbation exceeds a third selected threshold and identifying a reductant slip condition if so, otherwise identifying a poor efficiency operation condition for the internal combustion engine.

In addition to one or more of the features described above, or as an alternative, further embodiments may include a temperature sensor and another NOx sensor.

In addition to one or more of the features described above, or as an alternative, further embodiments may include that the another NOx sensor is upstream of the SCR device and wherein the determining includes computing a gradient of a temperature of the SCR device and a gradient of the NOx measured by the another NOx sensor.

In addition to one or more of the features described above, or as an alternative, further embodiments may include that the determining further includes identifying the SCR devices as at steady state if the gradient of a temperature of the SCR device is less than a third selected threshold value and a gradient of the NOx measured by the another NOx sensor is less than a fourth selected threshold value.

In addition to one or more of the features described above, or as an alternative, further embodiments may include that the predicted NOx value is based on a chemical model of the SCR.

In addition to one or more of the features described above, or as an alternative, further embodiments may include that the NOx sensor measures the NOx measurement downstream after the SCR of the exhaust gas.

In addition to one or more of the features described above, or as an alternative, further embodiments may include that at least one of the selected magnitude and selected duration of the perturbation of a reductant injection is based on at least one of a magnitude of the steady state reductant injection, an exhaust flow and a temperature.

In addition to one or more of the features described above, or as an alternative, further embodiments may include that the controller adapting a reductant dosing rate of the SCR device according to the ascertaining to achieve a desired NH3 storage.

Also described herein in an embodiment is a computer-implemented method for controlling a selective catalytic reduction (SCR) device of an exhaust system of an internal combustion engine. The method includes determining if the SCR device is in a steady state operating condition with a steady state reductant injection and comparing a steady state NOx measurement from a NOx sensor with a predicted steady state NOx value. In response to a magnitude of the steady state NOx measurement exceeding the predicted steady state NOx value by a first threshold value, the method also includes perturbing the reductant injection corresponding to the steady state; the perturbation of the reductant injection having a selected magnitude and a selected duration, measuring a NOx value resulting from the perturbation of the reductant injection and computing a gradient in the NOx value resulting from the perturbation of the reductant injection relative to the NOx value measured at steady state, determining if the reductant consumed by the SCR device resultant from the perturbing exceeds second selected threshold, and ascertaining if a gradient of the NOx resulting from the perturbing exceeds a third selected threshold and identifying a reductant slip condition if so, otherwise identifying a poor efficiency operating condition for the internal combustion engine.

In addition to one or more of the features described above, or as an alternative, further embodiments may include that the determining includes computing a gradient of a temperature of the SCR device and a gradient of the NOx measured by another NOx sensor, the another NOx sensor being located upstream of the SCR device.

In addition to one or more of the features described above, or as an alternative, further embodiments may include that the determining further includes identifying the SCR devices as at steady state if the gradient of a temperature of the SCR device is less than a third selected threshold value and a gradient of the NOx measured by the another NOx sensor is less than a fourth selected threshold value.

In addition to one or more of the features described above, or as an alternative, further embodiments may include that the predicted NOx value is based on a chemical model of the SCR.

In addition to one or more of the features described above, or as an alternative, further embodiments may include that the NOx measurement is made by a NOx sensor downstream after the SCR.

In addition to one or more of the features described above, or as an alternative, further embodiments may include that at least one of the selected magnitude and selected duration of the perturbation of the reductant injection is based on at least one of a magnitude of the steady state reductant injection, an exhaust flow and a temperature.

In addition to one or more of the features described above, or as an alternative, further embodiments may include adapting a reductant dosing rate of the SCR device according to the ascertaining to achieve a desired NH3 storage.

Further, in one or more examples, the controller further determines that an operating state of the internal combustion engine, and initializes the ammonia slip detection in response to the internal combustion engine operating in a steady state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
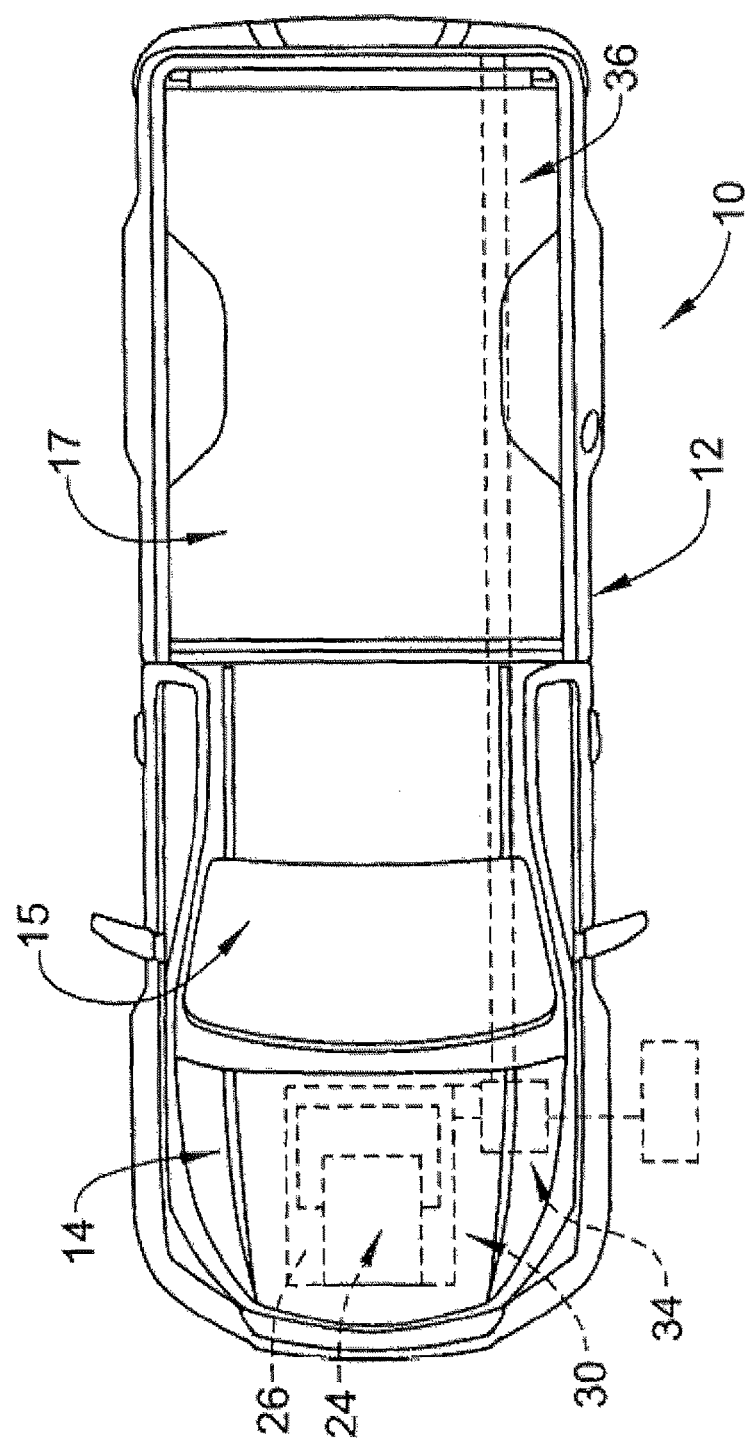
FIG. 1 depicts a motor vehicle including an internal combustion engine and an emission control system according to one or more embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e., two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc., as will be appreciated by those of skill in the art, whether explicitly described or otherwise would be appreciated by those of skill in the art.

A motor vehicle, in accordance with an aspect of an embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the illustrative embodiment shown, may include a diesel engine 26. Internal combustion engine system 24 includes an exhaust system 30 that is fluidically connected to an after treatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
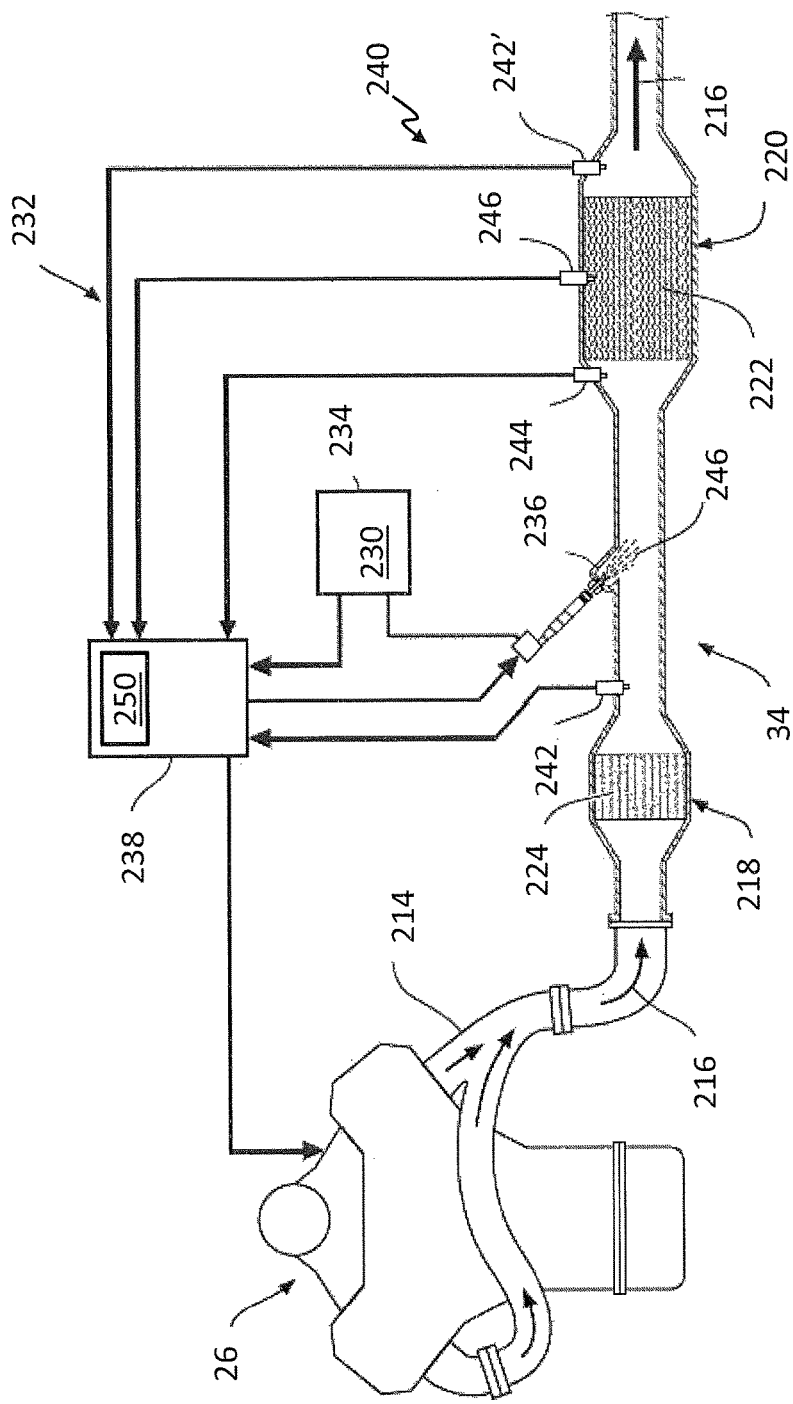
FIG. 2 illustrates example components of an emissions control system according to one or more embodiments.

FIG. 2 illustrates example components of the emissions control system 34 according to one or more embodiments. It should be noted that while the ICE system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the ICE system 24. For example, the technical solutions herein provide methods for controlling selective catalytic reduction (SCR) devices, and appurtenant $NO_x$ sensors, wherein the SCR devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, system 34 can include various additional treatment devices, including a diesel oxidation catalyst (DOC) devices 218, and particulate filter devices (not shown), among others.

As can be appreciated, the DOC device 218 can be of various flow-through, oxidation catalyst devices known in the art. In various embodiments the DOC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The DOC device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

The SCR device 220 may be disposed downstream from the DOC device 218. In one or more examples, the SCR device 220 includes a filter portion 222 that can be a wall flow filter, which is configured to filter or trap carbon and other particulate matter from the exhaust gas 216. In at least one embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant 230, such as at variable dosing rates. Reductant 230 can be supplied from a reductant supply source 234. In one or more examples, the reductant 230 is injected into the exhaust gas conduit 214 at a location upstream of the SCR device 220 using an injector 236, or other suitable method of delivery. The reductant 230 can be in the form of a gas, a liquid, or an aqueous solution, such as an aqueous urea solution. In one or more examples, the reductant 230 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR device 220 utilizes the reductant 230, such as ammonia ($NH_3$), to reduce the NOx. In one or more examples, a turbulator (i.e., mixer) (not shown) can also be disposed within the exhaust conduit 214 in close proximity to the injector 236 and/or the SCR device 220 to further assist in thorough mixing of reductant 230 with the exhaust gas 216 and/or even distribution throughout the SCR device 220.

The emissions control system 34 further includes a reductant delivery system 232 that introduces the reductant 230 to the exhaust gas 216. The reductant delivery system 232 includes the reductant supply 234, an injector 236. The reductant supply 234 stores the reductant 230 and is in fluid communication with the injector 236. Accordingly, the injector 236 may inject a selectable amount of reductant 230 into the exhaust gas conduit 214 such that the reductant 230 is introduced to the exhaust gas 216 at a location upstream of the SCR device 220.

In one or more examples, the emissions control system 34 further includes a control module 238 operably connected via a number of sensors to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute control process as described herein and a SCR chemical model 250, as described herein. The control module 238 can be operably connected to ICE system 24, SCR device 220, and/or one or more sensors. As shown, the sensors, shown generally as 240, can include an upstream $NO_x$ sensor 242a and downstream $NO_x$ sensor 242b, disposed downstream of SCR device 220, each of which are in fluid communication with exhaust gas in the exhaust gas conduit 214. In one or more examples, the upstream NOx sensor 242a is disposed downstream of the ICE 26 and upstream of both SCR device 220 and the injector 236. The upstream $NO_x$ sensor 242a and the downstream $NO_x$ sensor 242b detect a $NO_x$ level proximate to their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor 242a, 242b can be interpreted by control module 238, for example. Control module 238 can optionally be in communication with one or more temperature sensors, such as upstream temperature sensor 244, disposed upstream from SCR device 220.

The sensors of the emissions control system 34 may further include at least one pressure sensor 246 (e.g., a delta pressure sensor). The delta pressure sensor 230 may determine the pressure differential (i.e., $\Delta p$) across the SCR device 220. Although a single delta pressure sensor 230 is illustrated, it is appreciated that a plurality of pressure sensors may be used to determine the pressure differential of the SCR device 220. For example, a first pressure sensor (not shown) may be disposed at the inlet of the SCR device 220 and a second pressure sensor (also not shown) may be disposed at the outlet of the SCR device 220. Accordingly, the difference between the pressure detected by the second pressure sensor and the pressure detected by the first pressure sensor may indicate the pressure differential across the SCR device 220. It should be noted that in other examples, the sensors can include different, additional, or fewer sensors than those illustrated/described herein.

In one or more examples, the SCR device 220 includes one or more components that utilize the reductant 230 and a catalyst to transform NO and $NO_2$ from the exhaust gases 216. The SCR device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 216 in the presence of the reductant 230. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR catalyst generally uses the reductant 230 to reduce $NO_x$ species (e.g., NO and $NO_2$) to unregulated components. Such components include one or more of species which are not $NO_x$ species, such as diatomic nitrogen, nitrogen-containing inert species, or species which are considered acceptable emissions, for example. The reductant 230 can be ammonia ($NH_3$), such as anhydrous ammonia or aqueous ammonia, or generated from a nitrogen and hydrogen rich substance such as urea ($CO(NH_2)_2$). Additionally or alternatively, the reductant 230 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \quad (1)$$

$$4NO+4NH_3+O_2 \rightarrow 4N_2+6H_2O \quad (2)$$

$$6NO_2+8NH_3 \rightarrow 7N_2+12H_2O \quad (3)$$

$$2NO_2+4NH_3+O_2 \rightarrow 3N_2+6H_2O \quad (4)$$

$$NO+NO_2+2NH_3 \rightarrow 2N_2+3H_2O \quad (5)$$

It should be appreciated that Equations (1)-(5) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

The reductant 230 can be diluted with water in various implementations. In implementations where the reductant 230 is diluted with water, heat (e.g., from the exhaust) evaporates the water, and ammonia is supplied to the SCR device 220. Non-ammonia reductants can be used as a full or partial alternative to ammonia as desired. In implementations where the reductant 230 includes urea, the urea reacts with the exhaust to produce ammonia, and ammonia is supplied to the SCR device 220. Reaction (6) below provides an exemplary chemical reaction of ammonia production via urea decomposition.

$$CO(NH2)2+H2O \rightarrow 2NH3+CO2 \quad (6)$$

It should be appreciated that Equation (6) is merely illustrative, and is not meant to confine the urea or other reductant 230 decomposition to a particular single mechanism, nor preclude the operation of other mechanisms.

The SCR catalyst can store (i.e., absorb, and/or adsorb) reductant 230 for interaction with exhaust gas 216. For example, the reductant 230 can be stored within the SCR device 220 or catalyst as ammonia. A given SCR device 220 has a reductant capacity, or an amount of reductant or reductant derivative it is capable of storing. The amount of reductant 230 stored within an SCR device 220 relative to the SCR catalyst capacity can be referred to as the SCR "reductant loading", and can be indicated as a % loading (e.g., 90% reductant loading) in some instances. During operation of SCR device 220, injected reductant 230 is stored in the SCR catalyst and consumed during reduction reactions with NOx species and must be continually replenished. Determining the precise amount of reductant 230 to inject is critical to maintaining exhaust gas emissions at acceptable levels: insufficient reductant levels within the system 34 (e.g., within SCR device 220) can result in undesirable NOx species emissions ("NOx breakthrough") from the system (e.g., via a vehicle tailpipe), while excessive reductant 230 injection can result in undesirable amounts of reductant 230 passing through the SCR device 220 unreacted or exiting the SCR device 220 as an undesired reaction product ("reductant slip"). Reductant slip and NOx breakthrough can also occur when the SCR catalyst is below a "light-off" temperature, for example if the SCR device 220 is saturated with NH3 (i.e., no more storage sites). SCR dosing logic can be utilized to command reductant 230 dosing, and adaptations thereof, and can be implemented by module 238, for example.

A reductant injection dosing rate (e.g., grams per second) can be determined by the SCR chemical model 250 which, among other things, predicts the amount of reductant 230 stored in the SCR device 220 based on signals from one or more of reductant injection (e.g., feedback from injector 236) and upstream NOx (e.g., NOx signal from upstream NOx sensor 242a). The SCR chemical model 250 further predicts NOx levels of exhaust gas 216 discharged from the SCR device 220. The SCR chemical model 250 can be implemented by control module 238. The SCR chemical model 250 can be updatable by one or more process values over time, for example. A dosing governor (not shown), such as one controlled by module 238, monitors the reductant storage level predicted by the SCR chemical model 250, and compares the same to a desired reductant storage level based on SCR temperature and exhaust flow. Deviations between the predicted reductant storage level and the desired reductant storage level can be continuously monitored and a dosing can be triggered to increase or decrease reductant dosing in order to eliminate or reduce the deviation.

Over time, inaccuracies of the SCR chemical model 250 can compound to appreciative errors between modeled SCR reductant storage level and actual storage level. Accordingly, the SCR chemical model 250 can be continuously corrected to minimize or eliminate errors. One method for correcting an SCR chemical model 250 includes comparing the modeled SCR discharge exhaust gas NOx levels to the actual NOx levels (e.g., as measured by downstream NOx sensor 242b) to determine a discrepancy, and subsequently correct the model 250 to eliminate or reduce the discrepancy. Because NOx sensors (e.g., downstream NOx sensor 242b) are cross-sensitive to reductant (e.g., $NH_3$) and NOx, it is critical to distinguish between reductant signals and NOx signals as reductant slip can be confused with insufficient NOx conversion.

In one or more examples, a passive analysis technique used to distinguish between reductant signals and NOx signals is a correlation method which includes comparing the upstream NOx concentration (e.g., such as measured by upstream NOx sensor 242a) movement with the downstream NOx concentration (e.g., such as measured by downstream NOx sensor 242b), wherein diverging concentration directions can indicate an increase or decrease in reductant slip. The correlation analysis identifies when the measurements from the downstream NOx sensor 242b are following the pattern of measurements from (i.e., moving like) the upstream NOx sensor 242a. The correlation is a statistical measure of the strength and direction of a linear relationship between the two NOx sensors.

For example, the comparison includes a correlation method which includes comparing the downstream NOx concentration with the upstream NOx measurements, or the predicted NOx measurements, wherein diverging concentration directions can indicate an increase or decrease in reductant slip. For example, if the upstream NOx concentration decreases and downstream NOx concentration increases, reductant slip can be identified as increasing. Similarly, if the upstream NOx concentration increases and downstream NOx concentration decreases, reductant slip can be identified as decreasing. Thus, the divergence between the two sequences of NOx measurements can be used to determine a dosing status of the SCR device 220.

Alternatively, or in addition, the comparison includes a frequency analysis. NOx signals generated by NOx sensors can include multiple frequency components (e.g., high frequency and low frequency) due to the variation of the NOx and reductant concentrations during the modulation/demodulation. High frequency signals generally relate only to NOx concentration, while low frequency signals generally relate to both NOx concentration and reductant concentration. High frequency signals for upstream NOx and downstream NOx are isolated and used to calculate a SCR NOx conversion ratio, which is then applied to the isolated low pass upstream NOx signal to determine a low frequency downstream NOx signal. The calculated low frequency downstream NOx signal is then compared to the actual isolated low frequency downstream NOx signal, wherein a deviation between the two values can indicate reductant slip.

A drawback of the passive analysis techniques is that they cannot be implemented while the emission control system 34 and SCR device 220 is in steady state. "Steady state" is determined, for example, by taking the root mean square value of a NOx signal upstream from SCR device 220 (e.g., such as measured by upstream NOx sensor 242a) over a moving time frame; a sufficiently small value indicates a minimal variation in upstream NOx concentration and the SCR device 220 can be considered to be in steady state. For example, a steady state condition can be comprise a root mean square value of the upstream NOx concentration of less than a predetermined value, such as about 30 ppm, less than about 20 ppm, or less than about 10 ppm. SCR steady state conditions can often correlate with ICE 26 steady state conditions (e.g., generally consistent RPM, fuel injection, temperature, etc.) Intrusive tests can be used to distinguish between reductant signals and NOx signals, which include halting all or most reductant dosing for a period of time. While intrusive tests can be performed under steady state conditions, they can, in some circumstances, yield undesirable exhaust emissions during the test period, such as emissions with an increased NOx concentration.

Figure 3:
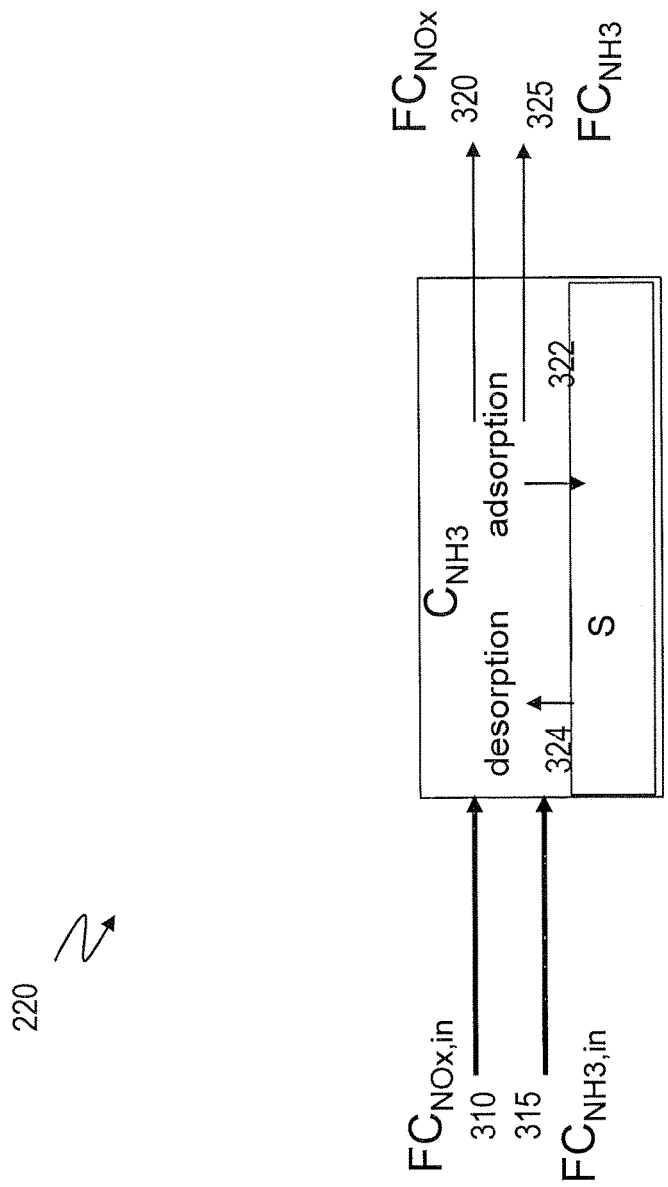
FIG. 3 illustrates an example flow of the gases through an SCR device, according to one or more embodiments.

FIG. 3 illustrates an example flow of the gas exhaust through the SCR device 220, according to one or more embodiments. The control module 238 measures the flow rate (F) of gas volume, and concentration C of the gas. For example, the SCR device 220 determines an input flow-rate of NOx 310 as $FC_{Nox,in}$, where F is the volume of the incoming gas 216, and $C_{Nox,in}$ is the inlet concentration of NOx in the incoming gas 216. Similarly, $FC_{NH3,in}$ is the volume of the flow-rate of NH$_3$ 315 in the incoming gas 216, $C_{NH3,in}$ being the inlet concentration of NH$_3$. Further, compensating for the amount of adsorption 322 and amount of desorption 324, and the amounts reacted on the catalyst surface, the control module 238 may determine $C_{NH3}$ as the SCR concentration of NH$_3$, and $C_{NOx}$ as SCR concentration of NOx.

Accordingly, $FC_{NOx}$ is the NOx outlet volume flow rate 320 of NO$_x$ through the outlet of the SCR device 220. In one or more examples, the control module 238 may determine $W_{NOx}FC_{NOx}$ as mass flow rate of NOx, where $W_{NOx}$ is the molecular weight of NOx. Similarly, for NH$_3$, the outlet volume flow rate 325 is $FC_{NH3}$ with the mass flow rate of NH$_3$ being $W_{NH3}FC_{NH3}$.

As described earlier, the control module 238 controls the reductant injection rate precisely; such as an ammonia producing urea aqueous solution injection rate. An insufficient injection rate may result in unacceptably low NOx conversions and thereby higher emissions. An injection rate that is too high results in release of ammonia from the SCR device 220 to the atmosphere. These ammonia emissions from SCR systems are known as ammonia slip. Ammonia slip is undesirable because of the emissions as well as exhausting the reductant supply 234 too rapidly.

Accordingly, referring back to FIG. 2, the control module 238 controls operation of the injector 236 based on the chemical model 250 and desired NH3 storage setpoint to determine an amount of reductant 230 to be injected as described herein. The control module 238 may determine a correction coefficient corresponding to the reductant storage based on monitoring the one or more sensors, and may more precisely control the amount of injected reductant 230 provided by the injector 236. For example, the control module 238 determines a reductant injector energizing time correction coefficient to further reduce or eliminate discrepancy between the chemical model 250 and actual SCR outlet NOx emissions. Alternatively, or in addition, the control module 238 determines a NH$_3$ set-point correction to reduce or eliminate discrepancy between the chemical model 250 and actual SCR outlet NOx emissions. Accordingly, the supply 234 of reductant 230 may be utilized more efficiently. For example, the reducing agent injected into the exhaust gas 216 may form NH$_3$ when injected into the exhaust gas. Accordingly, the control module 238 controls an amount of NH$_3$ supplied to the SCR device 220. The SCR catalyst adsorbs (i.e., stores) NH$_3$. The amount of NH$_3$ stored by the SCR device 220 may be referred to hereinafter as an "NH$_3$ storage level." The control module 238 may control the amount of NH$_3$ supplied to the SCR device 220 to regulate the NH$_3$ storage level. NH$_3$ stored in the SCR device 220 reacts with NOx in the exhaust gas 216 passing therethrough.

In one or more examples, the percentage of NOx that is removed from the exhaust gas 216 entering the SCR device 220 may be referred to as a conversion efficiency of the SCR device 220. The control module 238 may determine the conversion efficiency of the SCR device 220 based on NOx$_{in}$ and NOx$_{out}$ signals generated by the first (upstream) NOx sensor 242a and second (downstream) NOx sensor 242b respectively. For example, the control module 238 may determine the conversion efficiency of the SCR device 220 based on the following equation:

$$SCReff = (NOxin - NOxout)/NOxin \qquad (7)$$

NH$_3$ slip can also be caused because of an increase in the temperature of the SCR catalyst. For example, NH$_3$ may desorb from the SCR catalyst when the temperature increases at times when the NH$_3$ storage level is near to the maximum NH$_3$ storage level. NH$_3$ slip may also occur due to an error (e.g., storage level estimation error) or faulty component (e.g., faulty injector) in the emissions control system 34.

Typically, the control module 238 estimates an NH$_3$ storage level of the SCR device 220 based on the chemical model 250. In one or more examples, the NH$_3$ storage set-point ("set-point") is calibrate-able. The control module 238 uses the chemical model 250 to estimate the current storage level of NH$_3$ in the SCR device 220, and a storage level governor provides feedback to the injection controls to determine the injection rate to provide NH$_3$ for reactions according to the chemical model 250 and to maintain a target storage level. The set-point may indicate a target storage level for given operating conditions (e.g., a temperature of the SCR catalyst). Accordingly, the set-point may indicate a storage level (S) and a temperature (T) of the SCR device 220. The set-point may be denoted as (S, T). The control module 238 controls the reductant injector 236 to manage the amount of reducing agent injected into the exhaust gas 216 to adjust the storage level of the SCR device 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

The technical features described herein facilitate the emissions control system 34 to enter a steady state ammonia slip detection based on a downstream NOx. In some systems, steady state, ammonia slip detection is performed by disabling diesel exhaustive fluid (DEF) injection. However, such techniques may potentially increase NOx emissions during DEF injection dose-off events. Accordingly, in one or more embodiments, the ammonia slip and/or NOx breakthrough detection is performed by perturbing the emission control system 34, and more particularly, in an embodiment, perturbing the DEF injection rate, and monitoring the SCR device and NOx response rather than by disabling DEF injection to intrusively detect the presence of NH$_3$ slip or NOx breakthrough in steady state operating conditions. The use of such a perturbation technique advantageously can prevent the NOx emissions increases that may result from DEF injection disablement.

In one or more examples, the control module 238 uses the chemical model 250 of the SCR catalyst to predict the NOx concentration in the exhaust gases 216 entering the SCR device 220. Further, based on the predicted NOx concentration, the control module 238 determines an amount of NH$_3$ with which to dose the exhaust gases 216 to satisfy the emissions threshold. The control module 238 typically implements an adaptive semi-closed loop control strategy to maintain SCR performance according to the chemical model 250, where the control module continuously learns one or more parameters associated with the chemical model 250 according to the ongoing performance of the motor vehicle 10

Figure 4:
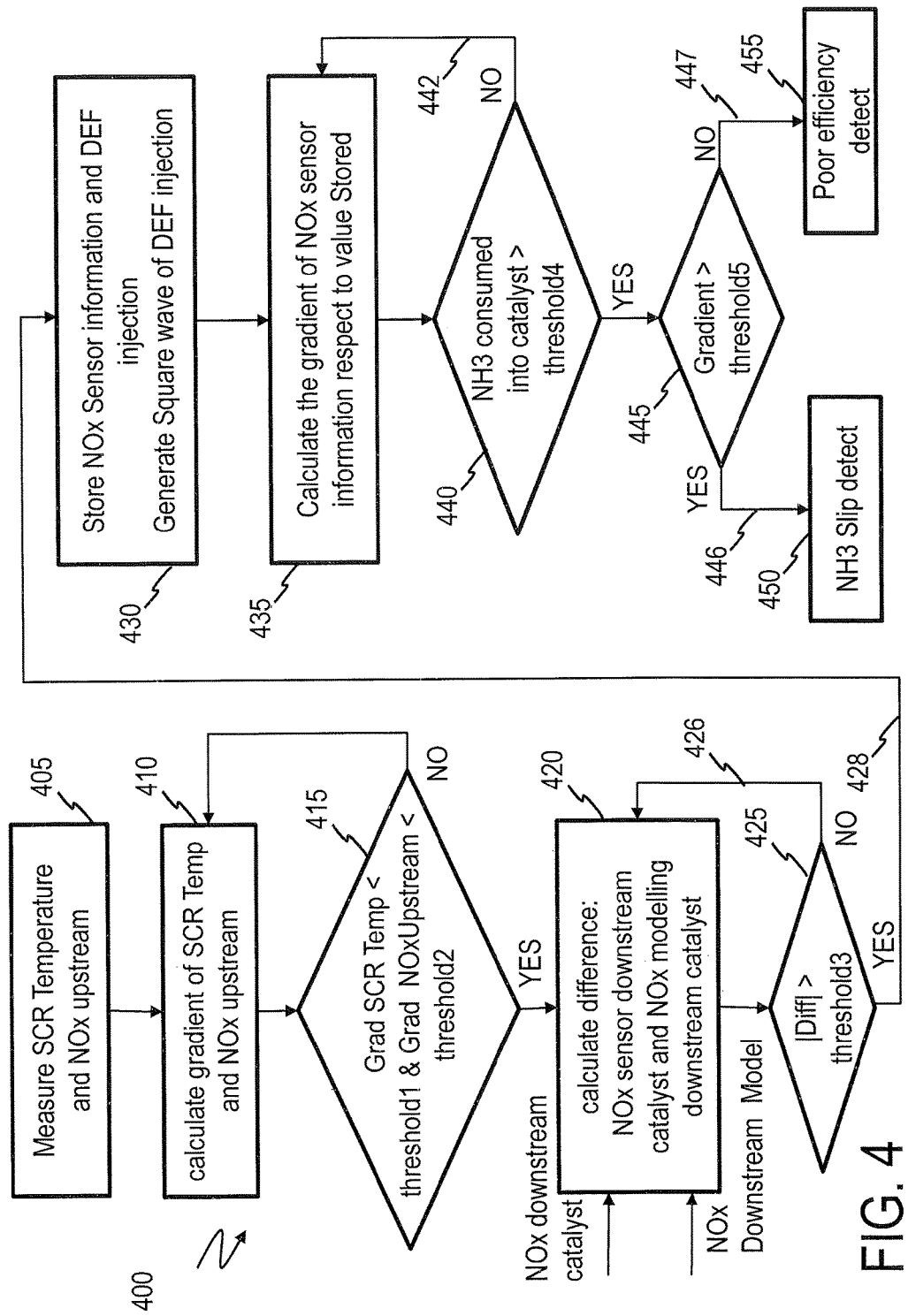
FIG. 4 illustrates a flowchart of an illustrative method for detecting ammonia slip in an SCR device according to one or more embodiments.

FIG. 4 illustrates a flowchart of an exemplary method 400 for detecting ammonia slip in an SCR device according to one or more embodiments. The method 400 is implemented by the controller 238, in one or more examples. Alternatively, the method 400 is implemented by one or more electric circuits. In one or more examples, the method 400 is implemented by execution of logic that may be provided or stored in the form of computer readable and/or executable instructions.

The method 400 includes receiving a measurement of NOx from the upstream NOx sensor 242b, and SCR device temperatures from the temperatures sensor 244 as shown at 405. Further, it is checked to see if the ICE 26 is in a preselected engine operating condition, such as a "steady state" operating condition where the NO$_x$ produced by the engine is substantially constant, as shown at process steps 410 and 415. For example, in an embodiment, a steady state operating condition may correspond to a condition where the vehicle 10 is motoring, e.g., engine speed or load is substantially constant. In one embodiment a gradient for the SCR temperature and the NOx upstream of the SCR device 220 is measured/determined. A gradient for each of less than a selected threshold is indicative of the ICE 26 operating in a steady state condition. In an embodiment, these two gradients are scalars and dependent of the catalyst performance. For example, in an embodiment, a gradient in the temperature of less than 0.5-1° C./s is employed, while a gradient in upstream NOx of less than 1-5 ppm/s is employed. It should be appreciated, while specific values or ranges have been provided to illustrate the operation of the described embodiments, other gradients and values are possible and within the breadth and scope of the claims. For example, one possible technique for steady state identification is to use a frequency analysis of the upstream NOx sensor 242a. Under engine steady state conditions the NOx concentration remains stable and in this condition, the RMS value of the high frequencies content of the signals from the NOx 242a is low, (e.g., thresholds around 5 to 10 ppm for frequencies above 0.01 Hz)

The method continues to detect NH$_3$ slip detection for other operating states of the ICE 26 and loop through such steps until the preselected steady state operating conditions of decision block 415 is detected, as shown at 420. If the ICE 26 is determined to be operating in steady state, the method performs a steady state NH$_3$ slip detection for the steady state operation of the ICE 26, as shown at 420. The steady state NH$_3$ slip detection includes computing a predicted downstream NOx value based on the chemical model 250 of the SCR device 220 as shown by 421. The predicted downstream NOx value is determined based on the semi-closed loop calculations described herein, along with one or more sensor values, such as inlet/outlet temperature, inlet/outlet pressure, and earlier NOx measurements, among others. The slip detection further includes comparing the NOx measurement from the sensor 242b as shown by 422 with the predicted downstream NOx value and/or determining the difference between the two values. The difference may be referred to as a NOx measurement error, in one or more examples.

The method further includes comparing the absolute value (i.e., magnitude) of the NOx measurement error with a threshold value, as shown at 425. If the difference is small, then the NOx emitted and that computed as emitted by the chemical model 250 correspond and further evaluation in not needed. In other words, if the magnitude of the NOx measurement error is less than (or equal to) a selected threshold the SCR device 220 is deemed to be operating without a NH$_3$ slip, and the operation continues to loop, as shown at 426. If the magnitude of the NOx measurement error is greater than the threshold the process continues to the perturbation testing of the described embodiments as depicted by line 428. Once again, it should be appreciated that the selected threshold may be a simple scalar and selected as a function of the components and configuration of the system. In one embodiment a threshold difference of 30-60 ppm/s is employed, though other values are possible.

It should be appreciated that the NOx measurement and predicted value may indicate a concentration of NOx in the exhaust gases 216. In such a case, in one or more examples, the predetermined threshold may correspond to a predetermined concentration of NOx, such as 37.5 ppm (or any other value). In one or more examples, the predetermined value may be determined based on a specified a statistic such as a standard deviation, for example 1.5 standard deviation. For example, the predetermined value may be calibrated to a modeled downstream NOx value that is considered acceptable. In an embodiment, the measured downstream NOx is thus normalized against the expected error of the sensor. The normalized error, 1.5 in this example, is then compared to the threshold for entry into steady state slip detection logic. The predetermined value of the concentration of the NOx that is used as the threshold for comparison, in such cases, is computed based on the earlier values of the NOx measured by the NOx sensor 242b. In other words, in the above example scenario, the 37.5 ppm is used as the threshold value because 37.5 is the 1.5 standard deviation value of earlier NOx measurements. It should be noted that in one or more examples, the NOx measurement and predicted value from the chemical model 250 used may be a NOx flow rate, or any other NOx attribute (instead of the NOx concentration).

Figure 5:
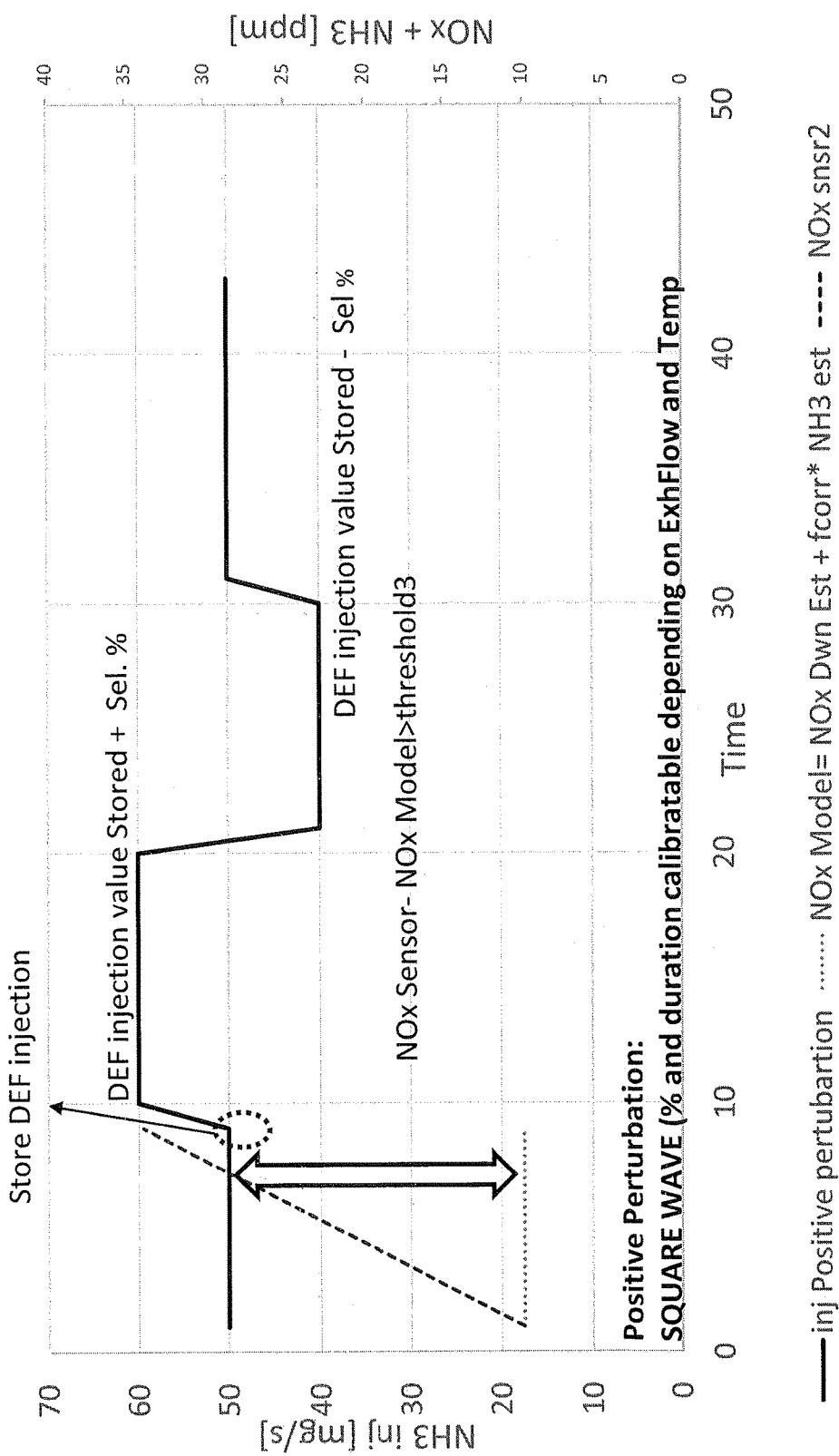
FIG. 5 illustrates a diagram of an injection perturbation in accordance with an embodiment.

Continuing with FIG. 4, and the method for detecting an $NH_3$ slip condition 400 in accordance with an embodiment. Following line 428, at process block 430, the method continues with storing the data regarding the NOx sensor information and current DEF injection employed. A perturbation input is generated and applied to the $NH_3$ injection. In an embodiment the perturbation input is substantially a single cycle of a square wave with opposite polarity peaks, also referred to as a doublet. The magnitude of the injection perturbation is a percentage of the current DEF injection for the steady state operation of the emission control system 34. In an embodiment the magnitude corresponds to the stored steady state value for the DEF injection plus an increment for the first half and minus an increment for the second half. Likewise the duration for the perturbation may be selected depending factors and operational parameters associated with the emission control system. For example, in an embodiment, the percentage magnitude and duration of the perturbation may be a function of the steady state exhaust flow through the SCR device 220 and the temperature measured by the temperature sensor 244. It should be appreciated that in general the magnitude and duration of the perturbation should be selected to be large enough to at least exhibit a measurable effect on the response of the system sufficient for measurement, without resulting in an overall impact on the steady state operation of the emission control system 34. FIG. 5 depicts an example graph time history 500 depicting the perturbation 502 as added to the nominal DEF injection. In the figure, it can be seen that a nominal steady state dosing of 50 mg/s of $NH_3$. Arrow 505 depicts when the NOx model 250 value as depicted by 504 deviates from the NOx sensor data beyond a threshold (shown as 506). When the deviation as depicted by arrow 505 is large enough, the perturbation is initiated as depicted at 508.

Continuing now with FIG. 4, with the introduction of the perturbation, as depicted at process step 435 the gradient of the NOx as measured by the downstream sensor 242b is compared with the steady state values prior to the perturbation and stored during step 430. Based on the comparison, as depicted at process step 440 if the amount of added $NH_3$ is not fully consumed by the catalyst in the SCR device 220 and exceeds a selected threshold, then the process is reiterates as shown by line 442. In an embodiment the threshold is a function of SCR characteristics. For example, in one embodiment the threshold is a function of the temperature of the SCR device 220 as measured by the temperature sensor 244. Furthermore, the threshold may be a function of the NOx level and/or exhaust flow. In one embodiment the threshold is on the order of 0.2-2.0 g. It should be appreciated, while specific values or ranges have been provided to illustrate the operation of the described embodiments, other gradients and values are possible and within the breadth and scope of the claims.

Returning to the figure, if the $NH_3$ consumed by the catalyst in the SCR device 220 exceeds the selected threshold, the gradient of the NOx measured from the steady state value is evaluated as depicted at process decision block 445. If the gradient exceeds another selected threshold, an $NH_3$ slip condition is detected and identified as depicted at line 446 and process block 450. If the gradient is less than or equal to the selected threshold, then poor efficiency and thereby potentially excessive NOx is detected and identified as shown at line 447 and process block 455. In an embodiment, once again the threshold is a function of SCR device characteristics. For example, in one embodiment the threshold is a function of the temperature of the SCR device 220 as measured by the temperature sensor 244. Furthermore, the threshold may be a function of the NOx level and/or exhaust flow. In one embodiment the threshold is on the order of 0.1 ppm/sec.-5.0 ppm/sec are possible It should be appreciated, while an specific values or ranges have been provided to illustrate the operation of the described embodiments, other gradients and values are possible and within the breadth and scope of the claims.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, such as a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance, but not limited to, a modulator/demodulator (modem; for accessing another device, system, or network), a radio frequency (RF) or other transceiver, a telephonic interface, a bridge, a router, etc.

One should note that FIGS. 3, 4 and 5 show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
a selective catalytic reduction (SCR) Device;
a NOx sensor; and
a controller that is configured to perform reductant slip detection by:
determining if the SCR device is in a steady state operating condition with a steady state reductant injection;
comparing a steady state NOx measurement from the NOx sensor with a predicted steady state NOx value; and
in response to a magnitude of the steady state NOx measurement exceeding the predicted steady state NOx value by a first threshold value:
perturbing the reductant injection corresponding to the steady state; the perturbation of the reductant injection having a selected magnitude and a selected duration;
measuring a NOx value resulting from the perturbation of the reductant injection and computing a gradient in the NOx value resulting from the perturbation of the reductant injection relative to the NOx value measured at steady state;
determining if the reductant consumed by the SCR device resultant from the perturbation exceeds a second selected threshold; and
ascertaining if a gradient of the NOx resulting from the perturbing exceeds a third selected threshold and identifying a reductant slip condition if so, otherwise, identifying a poor efficiency operating condition for the internal combustion engine.

2. The emissions control system of claim 1, further including a temperature sensor and another NOx sensor.

3. The emissions control system of claim 2, wherein the another NOx sensor is upstream of the SCR device and wherein the determining includes computing a gradient of a temperature of the SCR device and a gradient of the NOx measured by the another NOx sensor.

4. The emissions control system of claim 3, wherein the determining further includes identifying the SCR devices as at steady state if the gradient of a temperature of the SCR device is less than a third selected threshold value and a gradient of the NOx measured by the another NOx sensor is less than a fourth selected threshold value.

5. The emissions control system of claim 1, wherein the predicted NOx value is based on a chemical model of the SCR device.

6. The emissions control system of claim 1, wherein the NOx sensor is located downstream from the SCR device.

7. The emissions control system of claim 1, wherein at least one of the selected magnitude and selected duration of the perturbing of the reductant injection is based on at least one of a magnitude of the steady state reductant injection, an exhaust flow and a temperature.

8. The emissions control system of claim 1, further including the controller adapting a reductant dosing rate of the SCR device according to the ascertaining to achieve a desired $NH_3$ storage.

9. An exhaust system for treating exhaust gas emitted by an internal combustion engine, configured to perform a selective catalytic reduction (SCR) of exhaust gas, the exhaust system comprising:
  a controller configured to perform ammonia slip detection by:
    determining if an SCR device is in a steady state operating condition with a steady state reductant injection;
    comparing a steady state NOx measurement from the NOx sensor with a predicted steady state NOx value; and
    in response to a magnitude of the steady state NOx measurement exceeding the predicted steady state NOx value by a first threshold value:
    perturbing a reductant injection corresponding to the steady state; the perturbation of the reductant injection having a selected magnitude and a selected duration;
    measuring a NOx value resulting from the perturbation of the reductant injection and computing a gradient in the NOx value resulting from the perturbation of the reductant injection relative to the NOx value measured at steady state;
    determining if the reductant consumed by the SCR device resulting from the perturbing exceeds a second selected threshold; and
    ascertaining if a gradient of the NOx resulting from the perturbing exceeds a third selected threshold and identifying a reductant slip condition if so, otherwise, identifying a poor efficiency operating condition for the internal combustion engine.

10. The exhaust system of claim 9, further including a temperature sensor and another NOx sensor.

11. The exhaust system of claim 10, wherein the another NOx sensor is upstream of the SCR device and wherein the determining includes computing a gradient of a temperature of the SCR device and a gradient of the NOx measured by the another NOx sensor.

12. The exhaust system of claim 11, wherein the determining further includes identifying the SCR devices as at steady state if the gradient of a temperature of the SCR device is less than a third selected threshold value and a gradient of the NOx measured by the another NOx sensor is less than a fourth selected threshold value.

13. The exhaust system of claim 9, wherein the predicted NOx value is based on a chemical model of the SCR.

14. The exhaust system of claim 9, wherein at least one of the selected magnitude and selected duration of the perturbation of the reductant injection is based on at least one of a magnitude of the steady state reductant injection, an exhaust flow and a temperature.

15. The exhaust system of claim 9, further including the controller adapting a reductant dosing rate of the SCR device according to the ascertaining to achieve a desired $NH_3$ storage.

16. A computer-implemented method for controlling a selective catalytic reduction (SCR) device of an exhaust system of an internal combustion engine, the method comprising:
  determining if the SCR device is in a steady state operating condition with a steady state reductant injection;
  comparing a steady state NOx measurement from a NOx sensor with a predicted steady state NOx value; and
  in response to a magnitude of the steady state NOx measurement exceeding the predicted steady state NOx value by a first threshold value:
  perturbing the reductant injection corresponding the steady state; the perturbation of the reductant injection having a selected magnitude and a selected duration;
  measuring a NOx value resulting from the perturbation of the reductant injection and computing a gradient in the NOx value resulting from the perturbation of the reductant injection relative to the NOx value measured at steady state;
  determining if the reductant consumed by the SCR device resultant from the perturbing exceeds a second selected threshold; and
  ascertaining if a gradient of the NOx resultant from the perturbing exceeds a third selected threshold and identifying a reductant slip condition if so, otherwise, identifying a poor efficiency operating condition for the internal combustion engine.

17. The method of claim 16, wherein the determining includes computing a gradient of a temperature of the SCR device and a gradient of the NOx measured by another NOx sensor, the another NOx sensor being located upstream of the SCR device.

18. The method of claim 16, wherein the determining further includes identifying the SCR devices as at steady state if the gradient of a temperature of the SCR device is less than a third selected threshold value and a gradient of the NOx measured by the another NOx sensor is less than a fourth selected threshold value.

19. The method of claim 16, wherein at least one of the selected magnitude and selected duration of the perturbation of the reductant injection is based on at least one of a magnitude of the steady state reductant injection, an exhaust flow and a temperature.

20. The method of claim 16, further including adapting a reductant dosing rate of the SCR device according to the ascertaining to achieve a desired $NH_3$ storage.

* * * * *